United States Patent

Colligan

[15] 3,636,439
[45] Jan. 18, 1972

[54] REMOTE MEASURING TRANSFORMER COUPLED IMPEDANCE BRIDGE FOR BALANCED AND UNBALANCED CIRCUITS

[72] Inventor: Frank S. Colligan, 5200 Oakland Road, Chevy Chase, Md. 20015

[22] Filed: Jan. 7, 1970

[21] Appl. No.: 1,272

[52] U.S. Cl. ........................................................324/57 R
[51] Int. Cl. ..................................................G01r 27/00
[58] Field of Search.....................324/55, 57, 60, 61, 62, 65, 324/30; 323/75

[56] References Cited

UNITED STATES PATENTS

| | | | |
|---|---|---|---|
| 2,611,021 | 9/1952 | Perls et al. | 324/57 X |
| 2,650,347 | 8/1953 | Gaffney et al. | 324/58 |
| 2,376,394 | 5/1945 | Sinclair | 324/57 |
| 3,065,414 | 11/1962 | Sears et al. | 324/57 |

FOREIGN PATENTS OR APPLICATIONS 993,423   10/1951   France.....................................324/65

*Primary Examiner*—Edward E. Kubasiewicz
*Attorney*—Cushman, Darby & Cushman

[57] ABSTRACT

An impedance or admittance measuring bridge for use primarily at radiofrequencies capable of measuring balanced or unbalanced transmission lines and antennas and capable of determining the degree of balance of a transmission line and/or its associated antenna. A first balance circuit is coupled to a source of electrical energy and includes a signal detector for sensing the presence or absence of a known signal condition. A calibrated circuit having variable impedance is coupled to the first balance circuit whereby the unknown impedance/admittance is connected to the test circuit and whereby the calibrated circuit impedances are adjustable to create a null signal condition at the detector when the value of the unknown impedance is equal to the value of the calibrated circuit impedances.

8 Claims, 7 Drawing Figures

INVENTOR
FRANCIS J. COLLIGAN

INVENTOR
FRANCIS S. COLLIGAN

BY
Cushman, Darby & Cushman
ATTORNEY

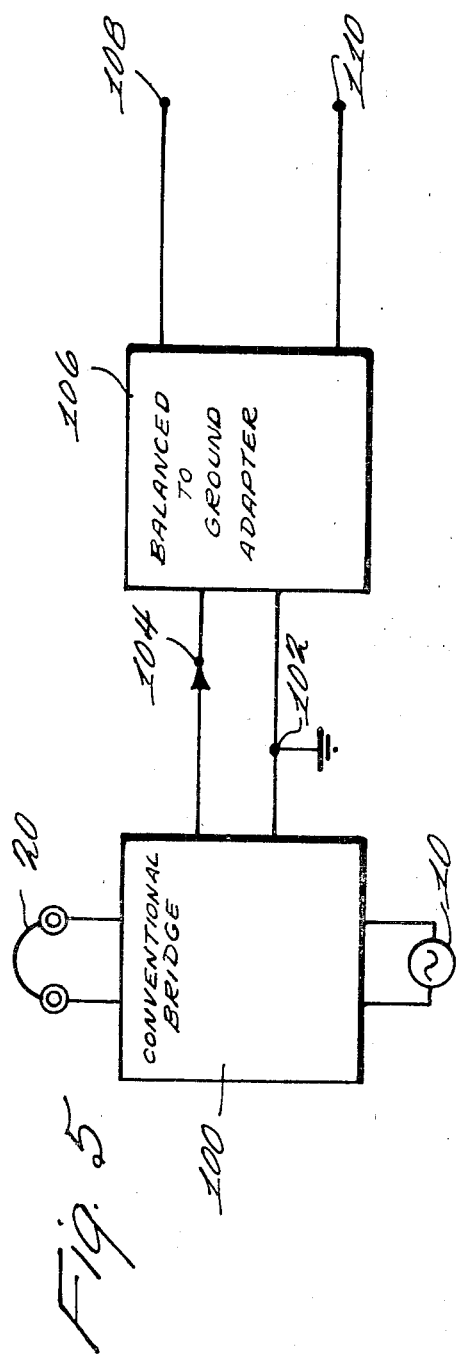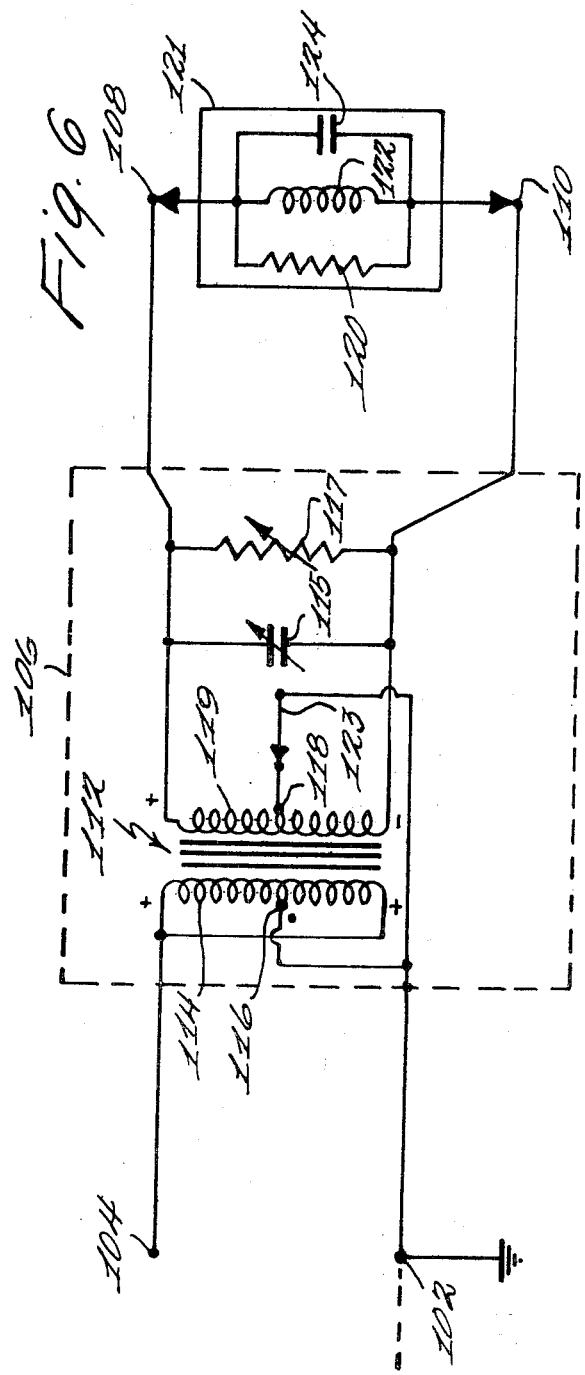

REMOTE MEASURING TRANSFORMER COUPLED IMPEDANCE BRIDGE FOR BALANCED AND UNBALANCED CIRCUITS

The present invention relates to measuring bridges and more particularly to an impedance/admittance measuring bridge which readily permits measurement on either balanced or unbalanced transmission lines and antennas and which also enables the determination of the degree of balance of a transmission line and/or its associated antenna.

Those concerned with the development of impedance/admittance measuring devices for antennas and transmission lines have long recognized the need for a device which measures accurately without the necessity for mathematical calculations and without the necessity for carrying the devices and all the associated equipment immediately adjacent to the point at which the desired measurement is to be taken. The present invention fulfills this need.

The general purpose of this invention is to provide an impedance/admittance measuring bridge which embraces all the advantages of similarly employed prior art bridges and possesses none of the aforedescribed disadvantages. To attain this the present invention utilizes a first balance circuit coupled to a calibrated circuit and a test circuit for receiving the unknown impedance whereby the bridge can measure either balanced or unbalanced transmission lines and antennas and whereby the degree of balance of a transmission line and/or its associated antenna can be determined so that one can proceed to refine and improve the status of balance of such a load. The present invention is also physically constructed in such a way as to permit easy and direct measurement of remotely located impedances so that the operator or engineer can be located at a comfortable location at the time that the readings take place.

An object of the present invention is the provision of an impedance/admittance measuring bridge particularly adapted for measuring impedances or admittances on transmission lines and antennas.

Another object is to provide an impedance/admittance measuring bridge which can measure either on balanced or unbalanced transmission lines and antennas.

A further object of the invention is the provision of an impedance/admittance measuring bridge which can be used to determine the degree of balance of the transmission line and/or its associated antenna.

Yet another object of the present invention is the provision of an impedance/admittance measuring bridge which is physically constructed in such a way as to easily permit the measurement of remotely located impedances.

A still further object is to provide an impedance/admittance measuring bridge which permits the direct measurement of remotely located impedances without the necessity of mathematical calculations.

Other objects and features of the invention will become apparent to those of ordinary skill in the art as the disclosure is made in the following description of a preferred embodiment of the invention as illustrated in the accompanying sheets of drawings in which:

FIG. 4 is a still more detailed schematic of that portion of the invention which can be remotely located from the bridge operator's position;

FIG. 5 is a block diagram of an alternative embodiment of the invention for adapting a conventional bridge for measurements on balanced-to-ground impedances or admittances;

FIG. 6 is a detailed schematic diagram of a portion of the invention illustrated in FIG. 5.

One of the most difficult problems faced by engineers in an attempt to measure driving point impedances of antenna elements, for example, has been the fact that these driving points are physically located hundreds of feet in the air and are supported by towers or poles. With present state of the art equipment the engineer is required to climb to these heights with a heavy load consisting of a bridge, generator and detector set. He must also place himself and the equipment extremely close to the dipole feed point in question. This has at least two disadvantages. Firstly, the engineer or technician is required to climb to the great heights at which the driving points are located with the concomitant risk to the safety of both the engineer and the equipment. Secondly, large errors can and often do result from having the impedance measuring equipment located too closely to the antenna. The very nature and purpose of an antenna, that of radiating energy, often results in undesirable leakage of this energy back into the measurement equipment thereby producing large errors in readings. As a result, engineers and technicians have been forced to run a temporary transmission line up to the point in question on the antenna with one end being connected to the point on the antenna and the other end being located on the ground. The characteristics of the transmission line are fully determined before the far end is connected to the antenna element, and after connecting the far end, bridge readings taken on the ground can be related to the premeasured characteristics of the temporary test line (its electrical length and characteristic impedance) in such a manner as to mathematically calculate the impedance existing at the out-of-reach driving point of the antenna element. Another very tedious problem must then be solved when making such measurements over a band of frequencies. This problem consists of compensating for the fact that not only does the antenna element impedance change with frequency but the temporary test lines transferring characteristics also change with frequency. The impedance/admittance measuring bridge herein described overcomes each of these disadvantages and provides an easy and direct method for measuring remote impedances.

Figure 1:
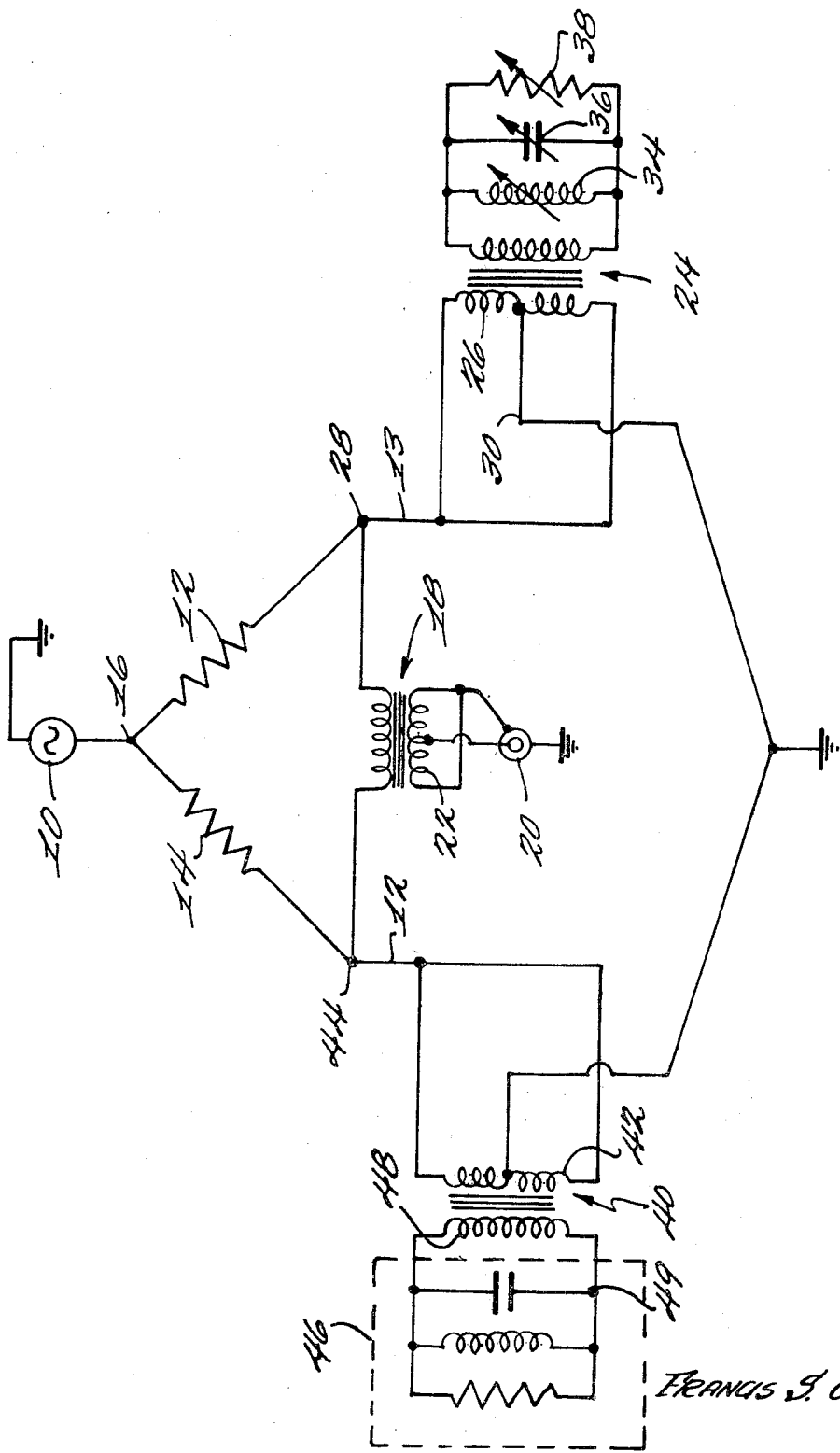
FIG. 1 is a schematic circuit diagram of the basic bridge of this invention.

With reference now to the drawings, wherein like reference characters designate like or corresponding parts through the several views, there is shown in FIG. 1 a basic schematic diagram of the bridge system. The source of electrical energy 10 such as a radiofrequency source, for example, applies energy to the bridge at a desired frequency. More particularly, the source 10 applies energy to a first balanced circuit which includes a first impedance 12 and a second impedance 14 which are coupled together at terminal 16. The first and second impedances are of equal value with respect to one another. A first transformer 18 is coupled between the first and second impedances and a signal detector 20 is coupled to the secondary 22 of the transformer 18.

A calibrated circuit is coupled to the first balanced circuit and includes a second balancing transformer 24 the primary side 26 of which is coupled to the first impedance 12 at terminal 28 and to electrical ground via a tap 30. The secondary 32 of the transformer 24 is connected in circuit with variable impedances 34, 36 and 38.

A test circuit is connected to the first balanced circuit and includes a third balancing transformer 40 the primary side 42 of which is coupled to the second impedance 14 at terminal 44. An unknown impedance, such as a transmission line or antenna 46 can be connected across the secondary 48 of transformer 40 and across a pair of electrical terminals 49 and 51.

If the impedance values from terminals 28 and 44 to ground are equal to each other in both phase and magnitude there will be a zero or null output at the detector 20 which is coupled to the secondary transformer 18. Transformers 24 and 40 are wound to be balanced on their secondaries and unbalanced on their primaries; however, neither transformer requires a perfect coupling coefficient or a broad bandwidth. They need only be perfectly balanced and identical to each other in all other respects. They need not be ideal transformers. Both transformers are illustrated as being terminated in a resistance, a capacitance and an inductance simply to illustrate that any variety of impedances or admittances may be involved with the units on the secondary of transformer 24 being calibrated variable standards while the impedances presented to the opposite transformer 40 are unknown values of a transmission line or antenna, for example. If both transformers 24 and 40 are identical in all respects and if the total resultant impedance on one secondary is equal in phase and magnitude to the terminating impedances on the other secondary, a zero output or null condition will occur at the detector 20. Since both secondaries 32 and 48 are inherently balanced with respect to neutral/ground, one can measure balanced loads or, by grounding either end of each secondary (see FIG. 2) one can readily measure unbalanced loads.

Figure 2:
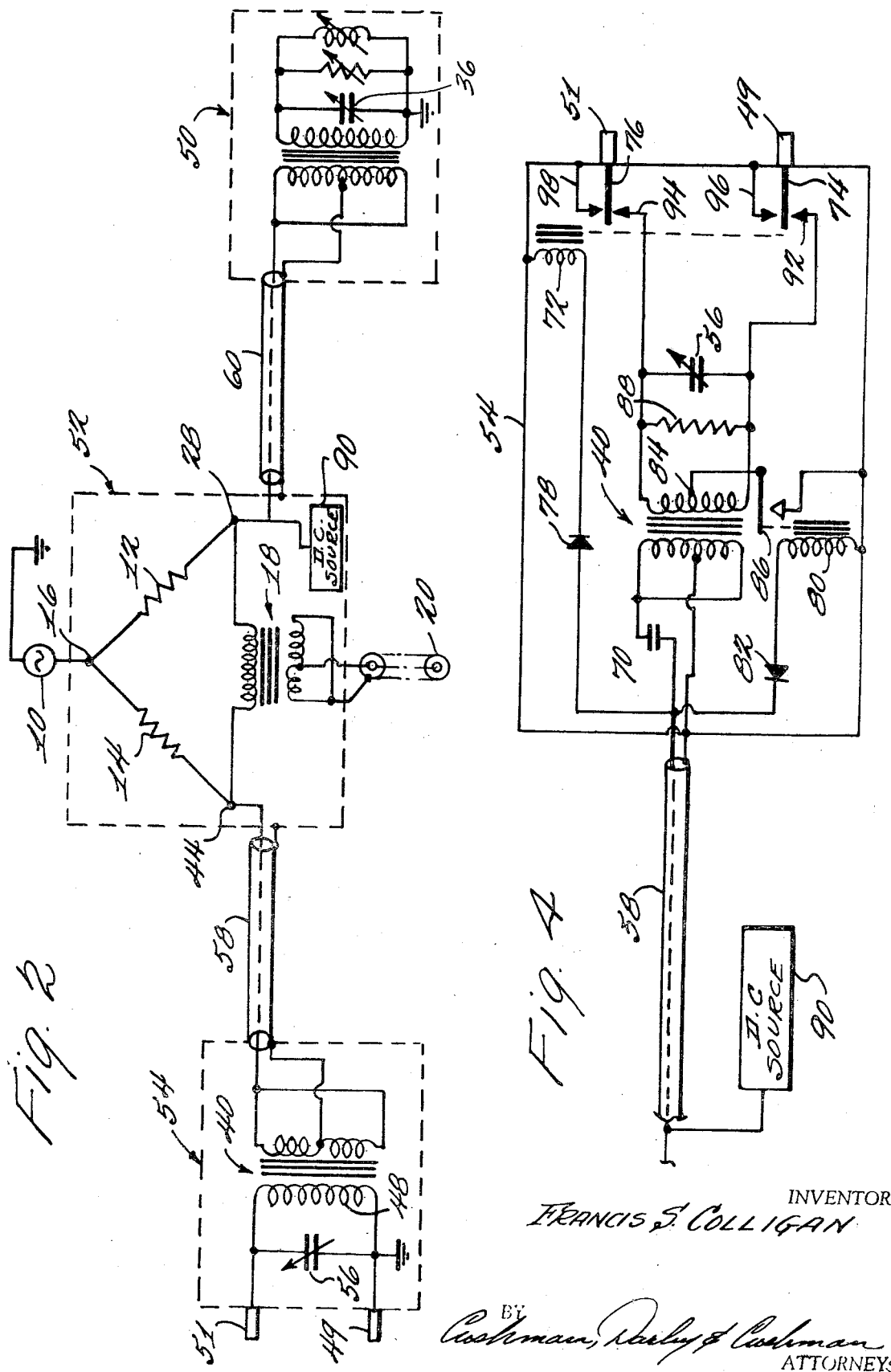
FIG. 2 is a more detailed schematic view of this invention.

FIG. 2 shows a more detailed diagram of the basic bridge circuit illustrated in FIG. 1. In FIG. 2 the bridge is divided up into the various elements which are placed into three shielded boxes 50, 52 and 54. The shielded box 52 contains the first balanced circuit and the signal detector while the box 50 contains the calibrated circuit and the box 54 contains the test circuit. In this more detailed schematic the third balancing transformer has a variable capacitor 56 in circuit across the secondary 48 and the terminals 49 and 51 are coupled to the secondary 48 for receiving the unknown impedance or admittance. The first balance circuit located in shield box 52 is connected to the calibrated circuit located in box 50 via shielded coaxial cable 58 while the first balance circuit in shielded box 52 is connected to the test circuit via shielded coaxial cable 60. It is important that these cables be of the same electrical nature and of the same precise length electrically with respect to one another. This is easily accomplished merely by trimming a previously rough cut pair of cables until the bridge shows a null at detector 20 with nothing at all connected to the far ends of the cables 58 and 60. The cables can be of any desired length as long as they are of the same length electrically.

By either series or parallel substitution the unknown impedance or admittance which is placed across terminals 49 and 51 can be determined by adjusting the calibrated elements 34, 36 and 38 until a null occurs at the detector 20 whereupon the known calibrated elements 34, 36 and 38 will be equal to the unknown element connected across the terminals 49 and 51. The variable capacitor 56 may merely be set to a convenient point before the unknown impedance is connected to terminals 49 and 51 and this capacitance will then be balanced out by capacitor 36 located in the calibrated circuit within the shielded box 50. The presence of capacitor 56 is desired since the unknown impedance, if not purely resistive, can easily be either capacitive or inductive. Upon obtaining a null with an inductive unknown impedance connected to terminals 49 and 51, the change in position setting of the calibrated capacitor 36 will be in a negative direction thus indicating an inductive unknown. The actual value of this downward change in capacitance is simply a difference capacity the reactance or susceptance of which is equal in magnitude though opposite in sign to that of the inductive reactance or susceptance of the unknown.

Figure 3:
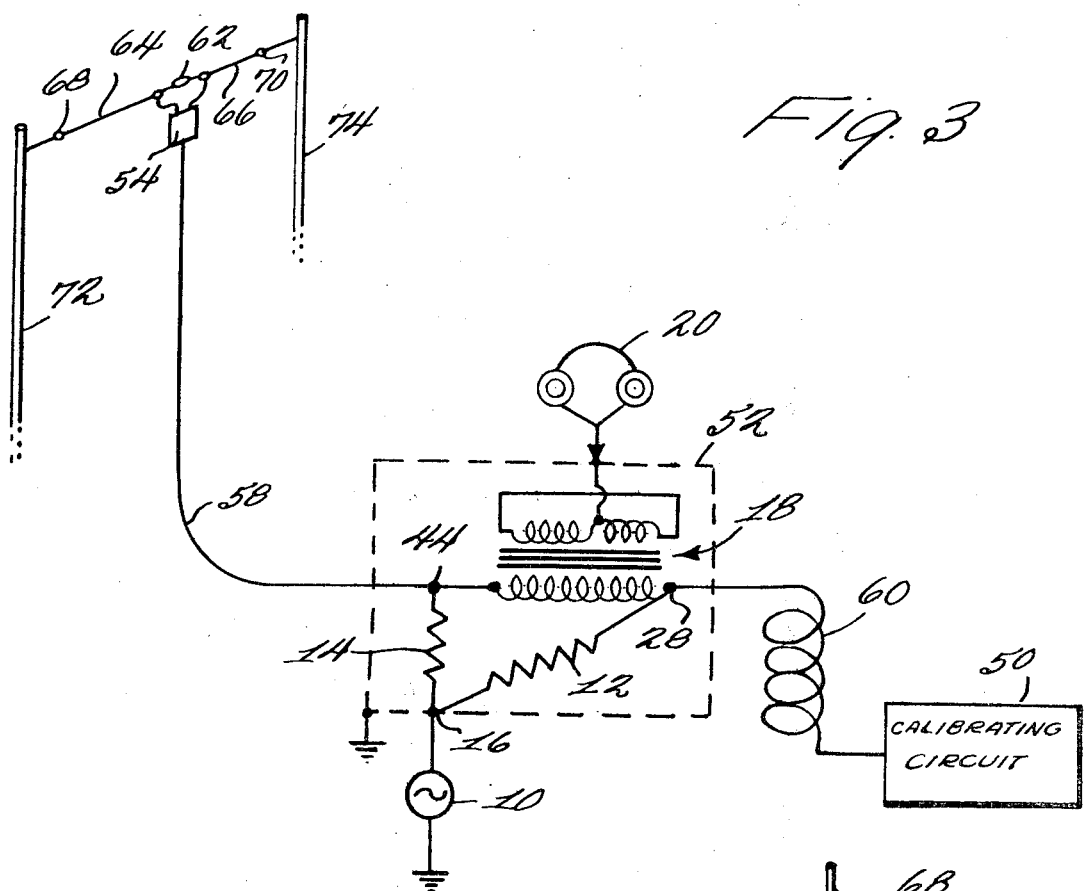
FIG. 3 is a diagrammatic view of a test and measurement arrangement utilizing the bridge of this invention.

FIG. 3 illustrates an actual test and measurement arrangement in the field near an antenna the driving points of which are located far out of convenient reach of the engineer or technician desiring to make measurements of the driving point impedances. This figure illustrates a simple dipole antenna element with no convenient location to place one's body or equipment adjacent to the dipole driving point 62. The dipole conductors 64 and 66 are connected to end insulators 68 and 70, respectively, which are supported by poles 72 and 74. The shielded container 54 having the test circuit and terminals 49 and 51 therein is located adjacent to the driving point 62 with the terminals being connected to the dipole conductors 64 and 66 at the driving point 62. The coaxial cable 58 is connected to the first balance circuit within the shielded box 52 while the calibrated circuit located within the shielded box 50 is connected to the first balance circuit via the shielded coaxial cable 60 which is an exact copy electrically of the cable 58 and which is simply coiled up in a convenient package since it is of the same length as cable 58 and is its electrical counterpart. Thus, impedance measurements of the remotely located load can be readily made with most of the equipment and the operator located at any convenient location and at a distance from the load or the driving point. In fact, the operator and the bulk of his equipment may be easily located in a building such as the transmitter building which in turn affords protection from the weather, the weather being a factor that more often than not completely shuts down all plans for a given time period of measurement work.

FIG. 4 shows a detailed schematic of the test circuit located within the shielded box 54. A blocking capacitor 70 is located in series circuit between the second impedance 14 and the primary side of the balancing transformer 40. A first relay 72 is in series circuit between the second impedance 14 and electrical ground and this relay includes two contacts 74 and 76, respectively connected to the contacts 49 and 51. A rectifier or diode 78 is also in circuit between the first relay coil 72 and the second impedance 14 while a second relay 80 and a second rectifier or diode 82 are in series circuit with one another and between the second impedance 14 and electrical ground. A center tap 84 is located on the secondary of the third balancing transformer 40 and a contact 86 operatively associated with the relay coil 80 is connected to the center tap 84 for selectively coupling the center tap to electrical ground when second relay coil 80 is energized. In addition, a resistor 88 is in parallel circuit with respect to the secondary of the transformer 40 and with respect to the variable capacitor 56.

The shielded box together with the circuitry therein is remotely located from a bridge operator's position with the unknown impedance connected across terminals 49 and 51. The shielded wall of the case 54 is considered to be common neutral ground for purposes of actuating the DC relays. The blocking capacitor 70 has a reactance which is so low at radiofrequencies as to insert no significant additional series impedance in the transformer primary circuit but it does appear as an open circuit to DC current. In operation of the circuit shown in detail in FIG. 4 a positive DC voltage may be applied to relay 72 with the DC voltage being controlled, applied and fed from the bridge operator's location and from a DC source 90. This DC current is transmitted to the relay 72 via the coaxial cable 58 and a positive voltage will energize relay coil 72 so that the contacts 74 and 76 will shift terminals 49 and 51 off of the transformer terminals 92 and 94 and over to a short circuit or grounded condition where the terminals 96 and 98 are connected to the shield 54. This is a safety feature to protect the instrument from radiofrequency energy that may be induced in the antenna being tested by other nearby antennas being fed with high-power radiofrequency energy. The operator can also check the open circuit initial balance condition of the entire bridge without having to have the unit removed from the antenna feed point.

The resistor 88 is in circuit to indicate that this basic bridge system may be operated on the basis of both direct and absolute measurement and a series or parallel substitution method. Diode rectifier 78 allows a positive DC voltage to pass to relay 72 while blocking any negative voltage. If a negative voltage is applied to the far end of the coaxial cable 58 it will be blocked by diode rectifier 78 but passed by diode rectifier 82 into relay 80. The purpose of this action is to momentarily ground the center tap 84 of transformer 40. After the operator has obtained his desired impedance or admittance reading he can apply a negative voltage to the coaxial cable 58 from the DC source 90 and as illustrated in FIG. 4 the center tap 84 will be grounded. If as the operator listens to the detector 20 the null shifts or ceases this indicates that his test antenna and/or transmission line is not properly balanced with respect to neutral/ground. Thus, this type of bridge affords the engineer not only a means for measuring a balance impedance but also provides a means with which to judge the status of balance of the unknown impedance in order to make appropriate corrections therefrom.

FIG. 5 illustrates a slightly different embodiment of this invention wherein a conventional bridge is adapted for measurements on balance-to-ground impedances or admittances. FIG. 5 illustrates a conventional bridge 100 well known in the art which is normally unsuited for such measurements. A signal generator or energy source 10 is provided in circuit therewith and a detector 20 is also in circuit with the bridge 100. The terminal 102 is connected to electrical ground while the terminal 104 is the normal unknown impedance test terminal of the conventional bridge 100. The terminal 104 is connected to the input of an alternative embodiment of my invention which is illustrated as the box 106 in FIG. 5. Terminals 108 and 110 are the balanced-to-ground unknown impedance/admittance terminals of this embodiment.

FIG. 6 shows this embodiment of the invention in more detailed schematic form. The "balun" or balancing transformer 112 having a primary winding 114 and a secondary winding 116 is coupled in circuit with the primary connected between the terminals 104 and 102. A tap from the primary 114 is coupled to ground while a tap 118 from the secondary winding 116 is coupled through a switch 123 to ground. This transformer need not be an ideal perfect transformer in any respect except that the secondary 116 must be balanced to ground at all frequencies of interest. The transformation ratio, coupling coefficient and other features of the transformer 112 are unimportant for the successful operation of this embodiment of the invention. The circuitry is again enclosed by standard RF shielding 106 and the variable capacitor 115 together with a variable resistor 117 are coupled in parallel together and with respect to the secondary winding 117 of transformer 112. Element 121 is the unknown impedance or admittance which contains unknown values of impedance or admittance represented as items 120, 122 and 124.

In operation, the calibrated standards 115 and 117 are set to their respective zero points. Unknown admittance terminals 108 and 110 are left open completely. A conventional bridge 100 is then used to measure the impedance existing between terminal 104 and ground. This value is virtually random and unimportant except in the final step it must be repeated. The final step consists of connecting the unknown admittance or impedance 121 across terminals 108 and 110 and then adjusting the calibrated variable standards 115 and 117 until the conventional bridge 100 results in a null reading at the detector 20. The impedance seen between terminal 104 and ground is then the same as it was at the beginning of the measurement procedure. That being the case, the unknown impedance or admittance 121 is equal to the difference in impedance or admittance of the standards 115 and 117 between their initial and final settings. This procedure of measurement is called parallel substitution measurement and while not shown the device of this invention can be equally well employed in direct parallel measurement, direct series impedance measurement or series substitution measurement.

The switch 123 provides an added feature of practical and increased usefulness. If the unknown admittance or impedance 121 is truly balanced, opening and closing switch 123 will cause no shift or change in the null of the system as indicated by detector 20. The transformer 112 is the absolute standard of balancing-to-ground and if anything is connected to the secondary 117 which is not perfectly balanced to ground there will be a current flow through the neutral center tap 118 via switch 123. If the null shifts upon opening the switch 123 the unknown impedance 121 is unbalanced.

Figure 7:
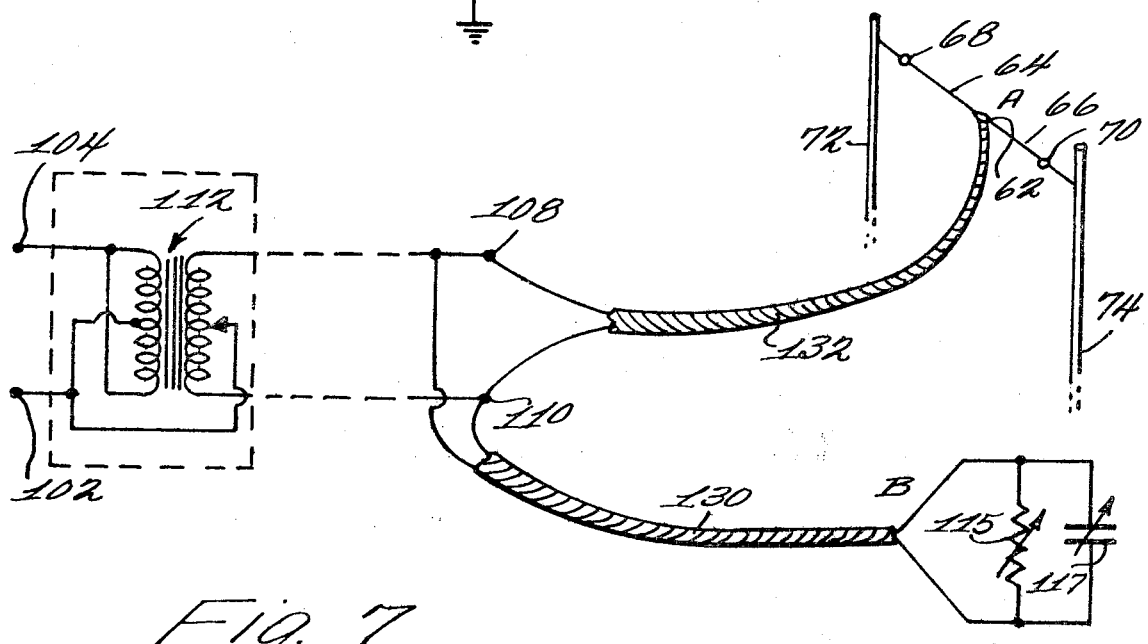
FIG. 7 is a diagrammatic view of the embodiment illustrated in FIGS. 5 and 6 as it is employed on a remote basis.

FIG. 7 illustrates how this embodiment of the invention may be employed on a remote basis. The conductors 64 and 66 illustrate a simple dipole radio antenna which is supported by poles 72 and 74 and which is insulated therefrom by insulators 68 and 70. The feed point of the dipole antenna located at 62 is the point of interest at which the impedance or admittance of the antenna is desired to be measured. However, the location of this feed point is far out of convenient reach by engineers or technicians and their equipment. This invention overcomes this disadvantage by locating the variable standards 115 and 117 at the end of a section 130 of balanced transmission line of a selected electrical length. An identical section of transmission line 132 connects the dipole antenna's feed point 62 to the device of this invention and across the terminals 108 and 110. The lengths of the lines 130 and 132 are precisely identical electrically and the device of this invention may be readily used to premeasure and preset these equalities between the transmission lines.

In performing the measurement of the impedance or admittance of the dipole antenna the line 132 and the antenna coupled thereto at point 62 are coupled across terminals 108 and 110. The conventional bridge 100 is then used to read the impedance seen between terminals 104 and ground as previously described. The unknown admittance line 132 is then removed from terminals 108 and 110 and the calibrated variable standards line 130 is connected to the terminals 108 and 110. Standards 115 and 117 are then readjusted to repeat the previously established null condition seen by the conventional bridge 100 and detected by the detector 20 at the outset of this procedure. At this point, the admittance of impedance produced by the standards 115 and 117 is precisely equal to the unknown admittance or impedance appearing at point 62, the feed point of the dipole antenna.

Thus, this invention provides for a unique impedance/admittance measuring bridge whereby the impedance or admittance of balanced or unbalanced transmission lines and antennas can be determined and whereby the degree of balance of a transmission line or antenna can be determined. In addition, this invention provides a bridge which permits the easy measurement of remotely located impedances and which obviates the necessity for the engineer or technician to climb to great heights with heavy equipment in order to make such measurements.

Obviously many modifications and variations of the present invention are possible in light of the above teachings. It is therefore to be understood that within the scope of the appended claims the invention may be practiced otherwise than as specifically described.

What is claimed is:

1. For use in combination with a conventional bridge normally unsuited for measurements on balanced-to-ground impedance or admittance and in circuit with a signal generator and with a null signal detector, a balanced-to-ground impedance/admittance determining network comprising:
   a balancing transformer having its primary side connected to an impedance measuring input terminal of said conventional bridge;
   a first center tap connected to said primary side and to electrical ground;
   a secondary side of said transformer;
   a second center tap connected to said secondary side and to electrical ground;
   a variable capacitor coupled across said secondary side;
   a variable resistor coupled in parallel circuit with said capacitor and said secondary side; and
   a pair of terminals respectively coupled to opposite sides of said secondary side for receiving and connecting to an unknown impedance or admittance.

2. A network as in claim 1 further including a switch in circuit between said second center tap and electrical ground for enabling the determination of whether said unknown impedance or admittance is balanced to electrical ground.

3. An impedance/admittance bridge, comprising:
   a first balancing circuit for coupling to a source of electrical energy and having a signal detector integral therewith for sensing the presence or absence of a null signal condition, said first balanced circuit including;
   a first terminal for coupling to said electrical energy source;
   a first impedance coupled to said first terminal;
   a second impedance of equal value with respect to said first impedance and coupled to said first terminal; and
   a first transformer coupled between said first and second impedance, said detector being coupled to said secondary of said transformer;

a calibrating circuit including variable impedances coupled to said first balanced circuit, said calibrating circuit including;

a second, balancing transformer, the primary side of which is coupled to said first impedance, to said first transformer and to a point of common electrical ground potential, and the secondary side of said second balancing transformer being connected in circuit with said variable impedances, a test circuit for coupling to an unknown impedance/admittance, said test circuit being coupled to said first balanced circuit whereby the calibrating circuit impedances are adjustable to create a null signal condition at said detector when the value of said unknown impedance is equal to the value of said calibrating circuit impedances, said test circuit including;

a third, balancing transformer, the primary side of which is coupled to said second impedance, to said first transformer and to a point of common electrical ground potential, a pair of electrical terminals for connecting to said unknown impedance; and the secondary side of said third balancing transformer being connected in circuit with said pair of terminals, a variable capacitor in circuit across the secondary side of said third balancing transformer, a blocking capacitor in series circuit between said second impedance and the primary side of said third balancing transformer;

a first relay coil in series circuit between said second impedance and electrical ground, two relay contacts respectively connected to said pair of electrical terminals for selectively connecting said pair of terminals to electrical ground or to the secondary side of said third balancing transformer, a second relay coil in series circuit between said second impedance and electrical ground, a center tap located on the secondary of said third balancing transformer, and a relay contact connected to said center tap for selectively coupling said center tap to electrical ground when said second relay coil is energized.

4. A bridge as in claim 3 further including a rectifier in circuit between said second relay coil and said second impedance.

5. A bridge as in claim 3 further including a resistor in parallel circuit with respect to said secondary of said third balancing transformer and said variable capacitor.

6. A remote impedance measuring system for directly measuring the complex impedance of a remote load relatively inaccessibly located at a more conveniently located site, said system comprising:

a test circuit including a first transformer having predetermined electrical characteristics located at the site of said remote load for transformer coupling of said load from input terminals to output terminals of said test circuit, a first length of transmission line having predetermined electrical characteristics and having one end electrically connected to the output terminals of said test circuit, and a conveniently located impedance measuring device comprising:

two equal impedances connected together as two adjacent arms of a four arm bridge circuit, signal source means connected to the connected junction of said equal impedances for supplying electrical power to the bridge circuit, detector means connected across the other ends of said equal impedances for detecting a null condition of said bridge circuit, the other end of said transmission line being connected with a first of said equal impedances whereby the transformer coupled remote load impedance is connected via said first transmission line as a third arm of said bridge circuit, calibrated variable known impedance elements, a second length of transmission line having the same predetermined electrical characteristics as said first length of transmission line, and a second transformer having the same predetermined electrical characteristics as said first transformer connected for transformer coupling between said known impedance elements and one end of said second length of transmission line, the other end of said second length of transmission line being connected to a second of said equal impedances whereby the transformer coupled known impedances are connected via said second transmission line as a fourth arm of said bridge circuit.

7. A remote impedance measuring system as in claim 15 wherein said first transformer comprises a first center-tapped winding with opposite ends thereof being normally connected across a nominally balanced-to-ground remote load and with the center tap normally connected to ground potential, and means for selectively and remotely disconnecting said center tap from ground potential whereby an unbalanced condition of said load may be detected.

8. A remote impedance measuring system as in claim 16 further comprising means for selectively and remotely disconnecting said opposite ends of said first center-tapped winding from said remote load whereby reference impedance measurements may be taken that are not dependent upon the value of said remote load impedance.

* * * * *